UNITED STATES PATENT OFFICE.

H. LEONARD, OF NEW BEDFORD, MASSACHUSETTS, ASSIGNOR TO HIMSELF AND H. RYDER, OF SAME PLACE.

IMPROVEMENT IN MOLDING PARAFFINE CANDLES.

Specification forming part of Letters Patent No. 22,921, dated February 8, 1859.

*To all whom it may concern:*

Be it known that I, HORATIO LEONARD, of New Bedford, in the county of Bristol and State of Massachusetts, have invented an Improvement in Manufacturing Paraffine Candles; and I do hereby declare that the following is a full and exact description thereof.

The object of my invention or improvement is to make a paraffine candle not only with an external surface very smooth and free from cavities, but having a regular semi-lucent or semi-pellucid appearance, or, in other words, to prevent the paraffine candle, when made, from presenting a cloudy or mottled appearance.

In carrying out my process I prefer to employ a candle-mold in which the body and tip matrices are separate from each other and the tip matrix is applied to the tubular-body matrix so as to be capable of being moved therein in a manner to enable a person by movement to expel the candle from the mold. Such molds, from my experience, I have found to be the best in making candles of paraffine, as on account of its being quite rich in carbon the paraffine candle has to be made with a wick of very small diameter, and of course not so strong as those employed in making wax, spermaceti, or tallow candles.

In passing from a liquid to a solid state, paraffine is very liable to crack or have a clouded, mottled, or irregular appearance, a very slight change of temperature being sufficient to produce these effects. This has rendered the manufacture of candles from paraffine a difficult matter, particularly when desirable to have them present a uniform, smooth, and semi-lucid appearance.

After the molds have been prepared with wicks in the usual manner, they are to be heated to a temperature of about 212° Fahrenheit. The most convenient mode of doing this that I am aware of is to fill them with paraffine at or somewhat above such temperature, and after suffering the same to remain in them a sufficient period they should be tipped over a vessel so as to discharge the paraffine from them. Any other proper method of heating them may be substituted, however, for that above described. The paraffine of which the candles are to be made should next, and at a temperature of about 212° Fahrenheit, be suffered to run into the molds, and after they may have been filled with it they should be plunged or dipped into a bath of water cooled to about 34° Fahrenheit, the water being suffered to come nearly or quite up to their tops. In this bath the molds, with their contents, should be suffered to remain about seven minutes, the same being long enough to suddenly chill the paraffine in contact with the inner surfaces of the molds. Next the molds should be removed from the water and be placed in a reservoir or body of air kept at a temperature from 32° to 40° Fahrenheit, and there suffered to remain about twenty minutes. By the air bath the cooling of the remainder of the paraffine will be gradual and at a rate which, generally speaking, will prevent it from cracking or becoming mottled or clouded.

The first and sudden chilling by means of water prevents the external surfaces of the candles from contracting or being formed with numerous indentations such as will result when the melted paraffine composing the candles is allowed to cool gradually either in water or in air, in which case the shrinkage of the matter about the wick or in radial directions therefrom is very liable to cause the external surface of the candle to be irregular or to bear numerous small cavities.

Although the temperature of the water bath corresponds nearly with that of the air bath used in cooling the paraffine, yet a much more rapid cooling of the paraffine takes place in the former than in the latter, for the reason that water is a much better conductor of heat than air. Besides, by the employment of the water bath it is believed that a small amount of water is taken up by capillary attraction in the candle-wick, or otherwise gets into the mold, and is vaporized, and the vapor passes up against the inner surface of the mold, or in some manner operates to improve the appearance or the quality of the candle. On removal of the candles from the molds more or less condensed vapor is generally found on the outer surfaces of the former. The effect to be produced cannot be brought about by the use of a cold-air bath for the surface cooling. Water or a liquid bath only will accomplish it, and, moreover, it is necessary that the temperature of each bath should be as hereinbefore mentioned. Furthermore, it becomes necessary, also, to have the molds at the temperature of the paraffine, or thereabout, at the time they are being supplied with it. Again, the desired results cannot be effected by the employment of water baths for the first and second refrigerators, nor by an air bath for the first and an air or a water bath for the second. The water bath must first be used, and this must be succeeded by the air bath.

I do not claim manufacturing candles by means of molds; but

What I claim as my improvement in molding paraffine candles is—

The improved process, substantially as described, the same involving the employment of a heated mold and water and air baths at temperatures and in the manner essentially as hereinbefore mentioned.

HORATIO LEONARD.

Witnesses:
 OLIVER PRESCOTT,
 E. C. LEONARD.